Oct. 17, 1967 MASAO KAWASHIMA ET AL 3,348,171

EQUALIZATION CIRCUITS

Filed Feb. 12, 1963

2 Sheets-Sheet 1

3,348,171

EQUALIZATION CIRCUITS

Masao Kawashima, Yokohama-shi, and Tsukumo Higeta, Kawasaki-shi, Japan, assignors to Fujitsu Limited, Kawasaki, Japan, a corporation of Japan Filed Feb. 12, 1963, Ser. No. 258,087
Claims priority, application Japan, Feb. 13, 1962, 37/5,372
10 Claims. (Cl. 333—28)

Our invention relates to equalization circuits and particularly to echo signal time equalizers.

Wide band wave-form transmission systems, such as for transmission of television video signals, must meet strict transmission standards with regard to effects upon amplitude and phase. However, in long-distance relay links, the small residual distortions in each relay section accumulate and, due to phase equalization, assume a very complicated form which includes distortions having no correlation between phase and amplitude. The usual transmission line is the electrical equivalent of a network of minimum phase shift type. In such a network, amplitude frequency characteristics correspond to phase frequency. Accordingly, this may be eliminated by eliminating the corresponding relation in television wave transmission. Thus, where there is distortion, both amplitude frequency and phase characteristics must be eliminated. In the case of a network with a limited band, phase distortion is generally generated within the band by distortion of amplitude frequency characteristics outside the band. Such phase distortion is extremely deleterious to wave transmission. In order to eliminate phase distortion, a phase equalizer is utilized.

Equalization of such distortions is not readily accomplished simply by cascading conventional amplitude-equalization networks or phase-equalization networks. For correcting such distortions, cosine equalizers have been developed. These correct and adjust the amplitude and frequency characteristics on the principle of harmonic analysis. Also known are so-called time or echo equalizers which correct both amplitude and phase, or group delay, characteristics independently. A typical equalization system is disclosed in U.S. Patent No. 3,290,607, issued Dec. 6, 1966. The above time equalizers are used mainly for equalization of distortion in the frequency domain. They utilize the output at taps in delay lines. However, such devices are faulty for equalization of wave forms because they do not achieve complete independence or separation between the echo taps and thus effect a faulty change of the final level after equalization.

Nevertheless most characteristic standards in television transmitting systems are based upon responses to a given wave form, for example a band-limited rectangular wave form. Thus it is essential to perform distortion equalization of transmission channels with regard to wave forms.

For such purposes there have been proposed so-called "differentiated signal echo" reverberation-type waveform equalizers in which the independence or separation between echo taps is improved by differentiation of the combined echo signals used for equalization, and final level changes due to equalization are eliminated.

It is an object of our invention to provide an improved echo-type time equalizer for wave-form equalization which avoids the before-mentioned deficiencies of existing equipment.

Another object of the invention is to provide an echo-type time equalizer which eliminates the final D.C. level changes due to equalization and which is effective for wave-form distortion which changes gradually. More particularly it is an object to improve the operation of the so-called "differentiated signal echo" reverberation-type wave-form equalizers.

According to a feature of our invention, we delay our distorted main signal in a delay line and sum up a plurality of echo signals from spaced taps along the delay line, differentiate the combined echo signals and apply them to the delayed main signal after expanding the effective equalization range of the delayed signal.

According to another feature of the invention, such expansion of the effective equalization range is accomplished by low-frequency equalization means for producing a gradually changing distortion in the wave form. According to another feature of the invention, such low-frequency equalization means comprise two RC combinations connected in series, each RC combination including a variable resistor and a variable capacitor connected in parallel, the resistors and capacitors being interconnected so that the total capacitance remains constant and the resistance ratio of the resistors also remains constant, the input to the equalization means being applied across both combinations and an output across only one of the combinations. More particularly we substitute for the attenuator of the proposed differentiated signal echo equalizers the above-mentioned low-frequency equalization means.

Other objects and advantages of the invention will be explained or will become obvious from the following detailed description when read in light of the accompanying drawings, wherein.

Figure 1:
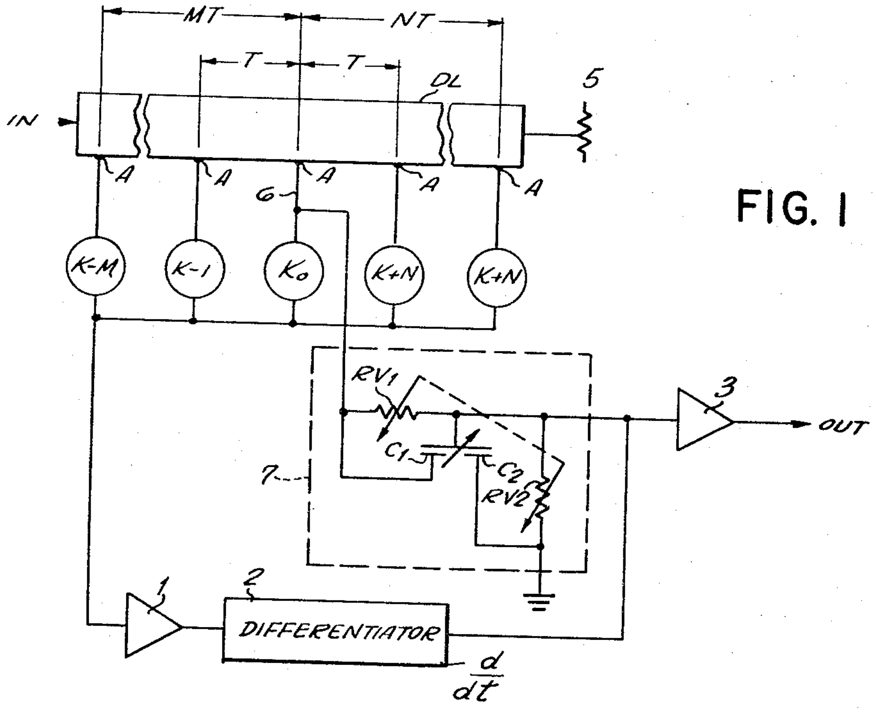
FIG. 1 is partially a block diagram and partially a schematic diagram of an echo-signal type of time equalizer embodying features of the present invention.

In FIG. 1 a video input terminal IN receives distorted video signals which pass through the equalizer and to the output terminal OUT. A delay line DL, to which the input signal IN is applied possesses a plurality of echo taps A and 6 located at time intervals T, where T equals $\frac{1}{2}fc$, $fc$ being the equalization band width. Distorted video input signals travel the line DL and are absorbed without reflection at 5. A main output signal having the same wave form as the input signal except for a given time delay is tapped off at the main tap 6 on line DL and passes to a low frequency equalizing circuit 7. Echo signals having a generally different wave form and respective time differences relative to the main signal serve for equalization of distortions. These signals are tapped at each tap A and 6 of the line DL and are adjusted by a plurality of echo-signal adjusters $K-M, \ldots K-1, KO, K+1, \ldots K+N$. The signal adjusters are described in United States Patent No. 3,290,607, issued Dec. 6, 1966. They are shown in FIG. 1 of such patent as components $A'_m \ldots A'_1, A_0, A_1 \ldots A_n$ and may comprise differential variable capacitors. The combination of these signals, after amplification by an amplifier 1, is connected through a differentiator 2 with the output of a low frequency equalizing circuit 7. The combined signal is then amplified in amplifier 3 and passes to the output OUT.

The differentiator 2 improves the independence or separation between echo signals at taps A and 6 in the wave-form equalization and eliminates level changes due to such equalization. The differentiator 2 may be of the type described in United States Patent No. 3,290,607 where it is realized with the "Q"-controlled L-C resonant circuit, which is tuned at the upper limit of the video frequency band, paralleled at the output of the vacuum tube wideband video amplifier. The operation of the differentiator 2 is described in the aforementioned patent.

The low frequency equalizing circuit 7 is a low-frequency equalization device for producing a gradually changing distortion in the wave form. It comprises a pair of jointly variable series connected resistors RV1 and RV2 across which the input is applied. The output is taken across the resistor RV2. The resistors are controlled to have a constant ratio at any setting. Capacitors C1 and C2, which are respectively connected across the resistors RV1 and RV2, form a differential variable condenser, C1, C2, wherein $C1+C2$ is a constant regardless of the setting. The equalizing circuit 7 itself has the equalization effect shown in FIG. 4.

Figure 2:
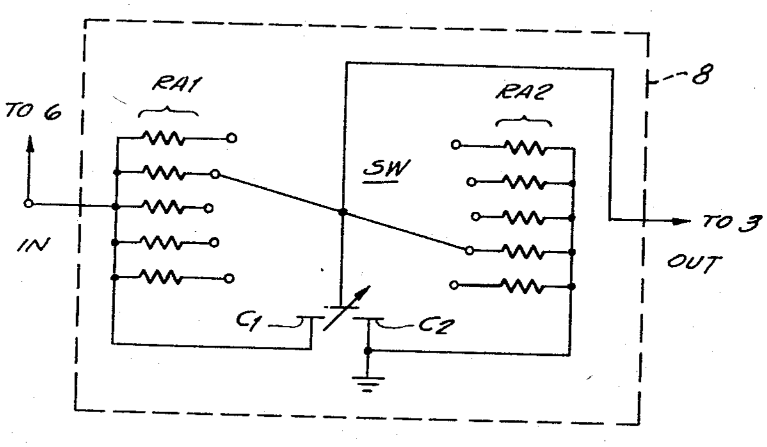
FIG. 2 is a schematic diagram of a circuit of an equalizer component which may be substituted for one of the components in FIG. 1 according to the present invention.

The equalizing circuit 7 may be replaced in FIG. 1 by the equalizing circuit 8 of FIG. 2. In FIG. 2 a switch SW selects one of a plurality of resistances RA1 and RA2. The resistances RA1 correspond to the resistance RV1 in FIG. 1. The resistances RA2 correspond respectively to the resistance RV2 in FIG. 1. The switch SW connects respective ones of RA1 and RA2 in series with each other. The capacitors C1 and C2 are respectively connected across resistors RA1 and RA2. The values of the individual resistors RA1 and RA2 are such that the ratio of $RA1/RA2$ remains constant regardless of switch position.

Figure 3:
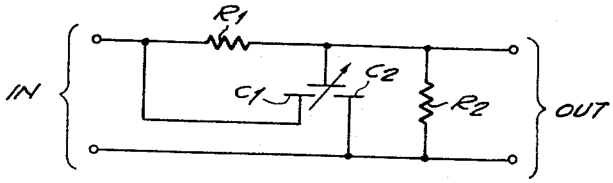
FIG. 3 is a schematic diagram of a low-frequency equalizer suitable for explaining the operation of FIGS. 1 and 2.
Figures 4, 6:
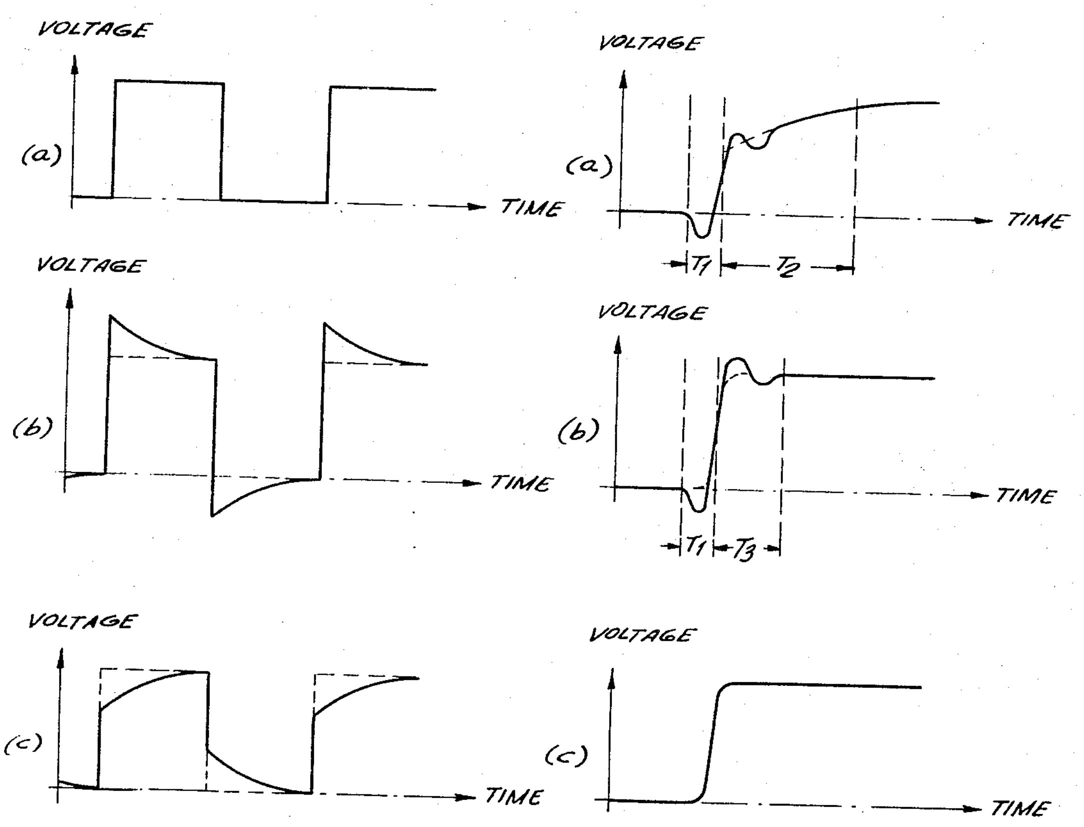
FIG. 4 is a group of graphs *a*, *b* and *c* of wave forms illustrating the responses of the circuit in FIG. 3 to a rectangular wave form.
FIG. 6 is a group of graphs *a*, *b* and *c* illustrating the distortion process in the echo-signal type equalizer according to the invention as shown in FIG. 1.

FIG. 3 illustrates a simplified form of the equalizing circuit 7 and the equalizing circuit 8. This simple CR minimum phase-shift type equalizer consists of two series resistances R1, R2, and differential variable condensers C1, C2 wherein $C1+C2$ equals a constant. Each of the capacitors C1 and C2 is connected across a corresponding one of the resistors R1 and R2. The input and output terminals are designated IN and OUT. The component has the equalization effects shown in FIG. 4. Phase shift equalizers are described in detail in the aforementioned patent. A square wave applied to terminal IN in the circuit of FIG. 3 when the latter is in the non-equalized condition (i.e. when C1 equals C2), produces the output shown in FIG. 4*a*. For the same square wave input FIGS. 4*b* and 4*c* illustrate respectively the outputs of FIG. 3 for maximum equalization states, i.e. for maximum C1 and maximum C2. This pattern of equalization is also true for the equalizing circuits 7 and 8.

As seen from FIG. 3, the effect of equalization of the equalizing circuits 7 and 8 can be changed continuously from that shown in FIG. 4*b* to that shown in FIG. 4*c* through that shown in FIG. 4*a* by varying the differential condensers C1, C2. The attenuation time constant can be adjusted to the form for distortion equalization by varying the continuously variable resistors RV1 and RV2 or by rotating the rotary switch SW.

Figure 5:
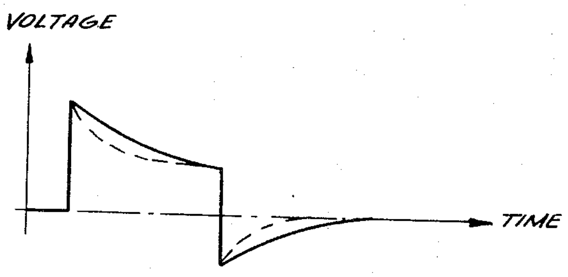
FIG. 5 is also a graph showing the responses of an equalizer according to the invention as shown in FIG. 1.

FIG. 5 illustrates the change of equalization effect of equalizing circuits 7 and 8 when R1, R2 is varied at constant C1, C2 with maximum C1 and constant $R1/R2$. The equalization effect changes from the form shown by the solid line to the form shown by the dotted line when R1, R2 is changed from large to small.

In operation a wave form to be equalized is applied to the terminal IN of FIG. 1. Such a wave form is illustrated in FIG. 6*a*. The wave form travels the delay line DL and is tapped off later in virtually unchanged form at tap 6. Then this main signal is applied to the equalizing circuit 7 which changes its shape to that shown in FIG. 6*b*. The range of distortion is thereby reduced from that shown in FIG. 6*a* as $T1+T2$ to the range $T1+T3$ of FIG. 6*b*. The main signal is then fed into amplifier 3 together with the combined echo signals from the delay line which have been amplified in 1 and differentiated in 2. The equalized output signal at terminal OUT of the amplifier 3 is shown in FIG. 6*c*.

FIGS. 6*a* and 6*b* illustrate that the equalizing circuit 7 in the circuit of FIG. 1 effectively extends the range of the equalization circuit.

The previously mentioned "differentiated signal echo" reverberation-type wave-form equalizer, which has been proposed for the purpose of obtaining the desired wave-form equalization corresponds to the circuit of FIG. 1, except that the equalizing circuit 7 constitutes a resistive voltage divider. The differentiator 2 improves the desired independence or separation between echo signal taps during wave-form equalization and eliminates level changes due to such equalization.

It is known from the sampling theorem that this proposed equalizer with the equalizing circuit 7 replaced by a voltage divider theoretically can equalize any type of distortion within the frequency band $fc<\frac{1}{2}T$, where T is the echo-tap separation, if the minimum period of distortion form in the frequency domain is more than ½NT, where $M>N$, or more than ½MT in the case of minimum phase-shift type distortion. In the time axis domain this means that for the band-limited wave form less than $fc$ where $fc$ equals ½T, shown in FIG. 5*a*, any type of distortion within the time range $-mT<t<+nT$ from the transient point of the signal can be equalized.

However in actual television transmission systems there exist minimum phase-shift distortions having correlation between amplitude and phase characteristics in addition to the complicated before-mentioned distortions wherein the amplitude does not correspond to phase. Furthermore, the level of this kind of distortion is comparatively large and extends up to the low-frequency range. On the wave form it corresponds to distortions varying gradually and in the simple form shown in FIG. 4. The previously proposed circuit may not be capable of coping with both types of distortion.

Theoretically, equalization of the above distortions could have been achieved by the previously proposed echo equalizer with the equalizing circuit 7 constituting a resistive voltage divider if the number and amplitude of signal taps were increased. However, this would have been expensive.

According to the invention equalization of the desired type is achieved with the circuit of FIG. 1 wherein the equalizing circuit 7 is a minimum-phase-shift component.

The equalizing circuit 7 effects an attenuation $RV2/(RV1+RV2)$ between input and output. It would thus seem that an amplification amounting to $$(RV2+RV1)/RV1$$

would be necessary. However in the proposed differentiated signal echo equalizer to which the equalizing circuit 7 is applied, attenuation is essential to adjust the main signal at 6 to the low level signal echoes at the differentiator 2. Thus the equalizing circuit 7 presents no disadvantage since it accomplishes a part or all of the required attenuation. No special amplifier for the main signal is needed. The equalizing circuit 7 adds a low frequency equalization to the proposed equalizer and extends its range.

While various embodiments of the invention have been described in detail it will be obvious to those skilled in the art that the invention may be practiced otherwise.

We claim:

1. An equalization circuit comprising delay means having an input terminal and a main output terminal, echo output means on said delay means, junction means, first circuit means connecting said main output terminal to said junction means, and second circuit means connecting said echo output means to said junction means, said second circuit means including a differentiating circuit, said first circuit means including a low-frequency equalizer network.

2. An equalization circuit comprising delay means having an input terminal and a main output terminal, echo output means on said delay means, junction means, first circuit means connecting said main output terminal to said junction means, and second circuit means connecting said echo output means to said junction means, said second output means including a differentiating circuit and amplifying means, said first circuit means including a low-frequency equalizer network.

3. An equalization circuit comprising delay means having an input terminal and a main output terminal, echo output means on said delay means, junction means, first circuit means connecting said main output terminal to said junction means, and second circuit means connecting said echo output means to said junction means, said echo output means including a plurality of echo output taps, said second output means including a plurality of control circuits connected to said taps, a differentiator, an amplifier connecting said control circuits to said differentiator, said differentiator being connected to said junction means; said first circuit means including a low-frequency equalizer network.

4. An equalization circuit comprising delay means having an input terminal and a main output terminal, echo output means on said delay means, junction means, first circuit means connecting said main output terminal to said junction means, and second circuit means connecting said echo output means to said junction means, said first circuit means including a low-frequency equalizer network having an input, an output, a pair of RC networks connected in series, said input being connected across both of said RC networks, said output being connected across one of said RC networks.

5. An equalization circuit comprising delay means having an input terminal and a main output terminal, echo output means on said delay means, junction means, first circuit means connecting said main output terminal to said junction means, and second circuit means connecting said echo output means to said junction means, said first circuit means including a low-frequency equalizer network having an input, an output, a pair of RC networks connected in series, said input being connected across both of said RC networks, said output being connected across one of said RC networks, said RC networks each including a resistor and a capacitor connected in parallel.

6. An equalization circuit comprising delay means having an input terminal and a main output terminal, echo output means on said delay means, junction means, first circuit means connecting said main output terminal to said junction means, and second circuit means connecting said echo output means to said junction means, said first circuit means including a low-frequency equalizer network having an input, an output, a pair of RC networks connected in series, said input being connected across both of said RC networks, said output being connected across one of said RC networks; said RC networks each including adjustable resistance means and a variable capacitor connected in parallel thereto, variable means for jointly adjusting said resistance means so that the respective resistance values thereof have a constant ratio, said capacitors forming an adjustable differential condenser having a constant total capacitance value whereby the equalization circuit may be adjusted.

7. An equalization circuit comprising delay means having an input terminal and a main output terminal, echo output means on said delay means, junction means, first circuit means connecting said main output terminal to said junction means, and second circuit means connecting said echo output means to said junction means, said echo output means including a plurality of echo output taps, said second output means including a plurality of control circuits connected to said taps, a differentiator, an amplifier connecting said control circuits to said differentiator, said differentiator being connected to said junction means, said first circuit means including a low-frequency equalizer network having an input, an output, a pair of RC networks connected in series, said input being connected across both of said RC networks, said output being connected across one of said RC networks, said RC networks each including adjustable resistance means and a variable capacitor connected in parallel thereto, variable means for jointly adjusting said resistance means so that the respective resistance values thereof have a constant ratio, said capacitors forming an adjustable differential condenser having a constant total capacitance value whereby the equalization circuit may be adjusted.

8. An equalization circuit comprising delay means having an input terminal and a main output terminal, echo output means on said delay means, junction means, first circuit means connecting said main output terminal to said junction means, and second circuit means connecting said echo output means to said junction means, said second circuit means including a differentiating circuit, said first circuit means including a low-frequency equalizer network having an input, an output, a pair of RC networks connected in series, said input being connected across both of said RC networks, said output being connected across one of said RC networks, said RC networks each including adjustable resistance means and a variable capacitor connected in parallel thereto, variable means for jointly adjusting said resistance means so that the respective resistance values thereof have a constant ratio, said capacitors forming an adjustable differential condenser having a constant total capacitance value whereby the equalization circuit may be adjusted.

9. An equalization circuit as claimed in claim 6, wherein said resistance means are variable resistors.

10. An equalization circuit as claimed in claim 6, wherein said resistance means comprise a plurality of resistors and wherein said variable means include a variable switch for connecting respective ones of said resistors in one means to the resistors of the other means.

References Cited

UNITED STATES PATENTS

| | | | |
|---|---|---|---|
| 2,852,750 | 9/1958 | Goldberg | 333—18 |
| 2,908,873 | 10/1959 | Bogert | 333—18 |
| 2,908,874 | 10/1959 | Pierce | 333—18 |
| 2,935,703 | 5/1960 | Luke | 333—20 |
| 2,976,516 | 3/1961 | Taber | 340—164 |
| 3,068,405 | 12/1962 | Glazier et al. | 324—68 |
| 3,105,197 | 9/1963 | Aiken | 328—154 |
| 3,181,089 | 4/1965 | Fujimoto | 333—28 |

HERMAN KARL SAALBACH, *Primary Examiner.*

C. BARAFF, *Assistant Examiner.*